US011763441B2

(12) United States Patent
Nakagawa et al.

(10) Patent No.: US 11,763,441 B2
(45) Date of Patent: Sep. 19, 2023

(54) INFORMATION PROCESSING APPARATUS

(71) Applicant: NTT DOCOMO, INC., Tokyo (JP)

(72) Inventors: Hiroshi Nakagawa, Tokyo (JP); Kazuhiro Yamada, Tokyo (JP); Youhei Oono, Tokyo (JP); Yuichiro Segawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 411 days.

(21) Appl. No.: 17/047,906

(22) PCT Filed: Apr. 23, 2019

(86) PCT No.: PCT/JP2019/017131
§ 371 (c)(1),
(2) Date: Oct. 15, 2020

(87) PCT Pub. No.: WO2019/208537
PCT Pub. Date: Oct. 31, 2019

(65) Prior Publication Data
US 2021/0174080 A1      Jun. 10, 2021

(30) Foreign Application Priority Data

Apr. 25, 2018    (JP) .................................. 2018-083892

(51) Int. Cl.
*G06T 7/00* (2017.01)
*G06T 7/11* (2017.01)
(Continued)

(52) U.S. Cl.
CPC .............. *G06T 7/0004* (2013.01); *A01G 7/00* (2013.01); *B64C 39/024* (2013.01); *G06T 7/11* (2017.01);
(Continued)

(58) Field of Classification Search
CPC .... A01G 7/00; B64C 39/024; B64U 2101/30; G06T 7/0004; G06T 7/11;
(Continued)

(56) References Cited

U.S. PATENT DOCUMENTS

2007/0070424 A1*   3/2007   Chiwata ............... B41J 2/04506
                                                                358/3.03
2008/0007654 A1*   1/2008   Ryu ....................... H04S 7/302
                                                                348/E5.112
(Continued)

FOREIGN PATENT DOCUMENTS

JP          2017015527 A      1/2017
WO          2017061589 A1     4/2017
(Continued)

OTHER PUBLICATIONS

Chang et al. ("A Fixed-Threshold Approach to Generate High-Resolution Vegetation Maps for IKONOS Imagery," Sensors (Basel). Jul. 2008; 8(7); Published online Jul. 25, 2008) (Year: 2008).*

(Continued)

*Primary Examiner* — Yubin Hung
(74) *Attorney, Agent, or Firm* — DILWORTH IP, LLC

(57) ABSTRACT

The accuracy of an index indicating growth conditions of a crop obtained from a shot image is improved, while reducing the flight time of an aircraft shooting the crop. Crop image acquisition unit acquires an image of a crop region shot by drone. Index calculation unit calculates an index indicating growth conditions of a crop shot in the image based on the acquired image of the crop region. Flight instruction unit instructs, if a portion (low index region) regarding which the calculated index is less than a predetermined index threshold is present in the crop region, drone to shoot the low index region while increasing the resolution of the image. Specifically, flight instruction unit makes an instruction to shoot the portion while performing a low-altitude flight at an altitude lower than that when the image regarding which the index of the low index region has been calculated has been shot.

10 Claims, 12 Drawing Sheets

(51) Int. Cl.
  *G06V 10/50* (2022.01)
  *G06V 20/10* (2022.01)
  *G06V 20/17* (2022.01)
  *A01G 7/00* (2006.01)
  *B64C 39/02* (2023.01)
  *B64U 101/30* (2023.01)

(52) U.S. Cl.
  CPC .............. *G06V 10/50* (2022.01); *G06V 20/17* (2022.01); *G06V 20/188* (2022.01); *B64U 2101/30* (2023.01); *G06T 2207/30188* (2013.01)

(58) Field of Classification Search
  CPC .......... G06T 2207/30188; G06V 10/50; G06V 20/17; G06V 20/188
  See application file for complete search history.

(56) References Cited

U.S. PATENT DOCUMENTS

| | | | |
|---|---|---|---|
| 2010/0201849 A1* | 8/2010 | Cheng | G06T 7/254 348/238 |
| 2017/0003690 A1 | 1/2017 | Tanahashi | |
| 2018/0218228 A1* | 8/2018 | Takaki | G06V 10/80 |
| 2018/0290745 A1 | 10/2018 | Kumada | |
| 2018/0359452 A1* | 12/2018 | Chae | G08B 13/1965 |
| 2019/0094888 A1 | 3/2019 | Hiroi | |
| 2019/0094890 A1* | 3/2019 | Qian | G05D 1/106 |
| 2019/0210722 A1 | 7/2019 | Sugaya | |

FOREIGN PATENT DOCUMENTS

| | | |
|---|---|---|
| WO | 2017169516 A1 | 10/2017 |
| WO | 2017221641 A1 | 12/2017 |
| WO | 2018061176 A1 | 4/2018 |

OTHER PUBLICATIONS

Susaki et al. ("Crop field extraction method based on texture analysis and automatic threshold determination," IEEE Int'l Geoscience and Remote Sensing Symposium; Date of Conference: Jun. 28, 1999-Jul. 2, 1999) (Year: 1999).*

Na et al. ("Mapping the spatial distribution of barley growth based on unmanned aerial vehicle," 6th International Conference on Agro-Geoinformatics; Date of Conference: Aug. 7-10, 2017) (Year: 2017).*

International Search Report issued in corresponding PCT Application No. PCT/JP2019/017131, dated Jul. 23, 2019.

Office Action issued by the Japanese Patent Office in corresponding Japanese Patent Application No. 2020-515468, dated Mar. 7, 2023; 8 pages.

* cited by examiner

| AVERAGE VALUE OF PIXEL VALUES | NDVI ACCURACY |
|---|---|
| LESS THAN Ave1 | LOW |
| Ave1 OR MORE AND LESS THAN Ave2 | MEDIUM |
| Ave2 OR MORE | HIGH |

| NDVI ACCURACY | INDEX THRESHOLD |
|---|---|
| HIGH | Th1 |
| MEDIUM | Th2 |
| LOW | Th3 |

| AVERAGE VALUES OF DIFFERENCES | NDVI ACCURACY |
|---|---|
| LESS THAN Dif1 | HIGH |
| Dif1 OR MORE AND LESS THAN Dif2 | MEDIUM |
| Dif2 OR MORE | LOW |

| E111 LOW | E114 MEDIUM | E117 LOW |
|---|---|---|
| E112 MEDIUM | E115 HIGH | E118 MEDIUM |
| E113 LOW | E116 MEDIUM | E119 LOW |

*FIG. 15*

| POSSIBLE FLYING DISTANCE | INDEX THRESHOLD |
|---|---|
| LESS THAN Dis1 | Th1 |
| Dis1 OR MORE AND LESS THAN Dis2 | Th2 |
| Dis2 OR MORE | Th3 |

| DEVIATION VALUE | INDEX THRESHOLD |
|---|---|
| LESS THAN 0.25 | Th1 |
| 0.25 OR MORE AND LESS THAN 0.5 | Th2 |
| 0.5 OR MORE | Th3 |

*FIG. 19*

| SHIFT DISTANCE | INDEX THRESHOLD |
|---|---|
| L21 OR MORE | Th1 |
| L11 OR MORE AND LESS THAN L21 | Th2 |
| LESS THAN L11 | Th3 |

| CROP TYPE | FLIGHT ALTITUDE |
|---|---|
| CABBAGE, RADISH, etc. | H1 |
| RICE, WHEAT, etc. | H2 |
| CORN, SUGARCANE, etc. | H3 |

AVERAGE OF DIFFERENCES + 0.75

CORRECT NDVI OF SECTIONAL REGIONS IN FIRST SHOOTING

INFORMATION PROCESSING APPARATUS

TECHNICAL FIELD

The present invention relates to a technique for detecting growth conditions of crops.

BACKGROUND

A technique for detecting growth conditions of crops is known. JP-2017-15527A discloses a technique for detecting growth conditions of a wide range of crops using a state detection sensor provided in an unmanned aircraft.

When an index (e.g., NDVI) indicating the growth conditions of a crop is obtained based on an image shot from the sky using an aircraft such as a drone, it is likely that as the shooting range is increased, although the flight time is shortened, the accuracy of the obtained index decreases.

Therefore, an object of the present invention is to improve the accuracy of an index indicating the growth conditions of a crop obtained from a shot image while reducing the flight time of an aircraft that shoots the crop.

SUMMARY OF INVENTION

In order to achieve the above-described object, the present invention provides an information processing apparatus that includes: an image acquisition unit that acquires an image of a crop region that is shot by an aircraft that includes a shooting function; a calculation unit that calculates, based on the acquired image, an index indicative of growth conditions of a crop in the image; and an instruction unit that, in a case where in a portion of the crop region the calculated index is less than an index threshold, instructs the aircraft to shoot the portion with an increased resolution or a narrowed shooting range.

According to the present invention, it is possible to improve the accuracy of an index indicating the growth conditions of a crop obtained from a shot image while reducing the flight time of an aircraft that shoots the crop.

BRIEF DESCRIPTION OF DRAWINGS

FIG. 15 is a diagram illustrating an example of sectional regions regarding which the shooting region is the same, in accordance with the present invention.

FIG. 19 is a diagram illustrating an example of a threshold table, in accordance with the present invention.

DETAILED DESCRIPTION

1. Embodiment

Figure 1:
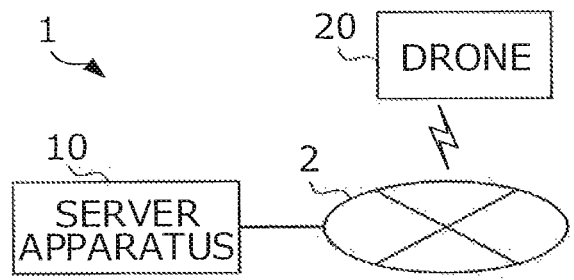
FIG. 1 is a diagram illustrating an overall configuration of an agriculture support system, in accordance with the present invention.

FIG. 1 is a diagram illustrating an overall configuration of agriculture support system 1 according to an embodiment. Agriculture support system 1 is a system for supporting a person who works in a field (place where crops such as rice and vegetables are grown) by utilizing an index indicating the growth conditions of a crop. The index indicating the growth conditions is an index indicating one of or both of the degree of advancement in the growth stage of the crop (e.g., whether or not the period is appropriate for harvesting) and the conditions (also referred to as an activity level) such as a size and whether or not a disease is present.

In the present embodiment, an NDVI (Normalized Difference Vegetation Index), which will be described later, is used, and an index indicating the growth conditions of a crop in a field is calculated using an image of the field that is shot from the sky by an aircraft. The aircraft is not specifically limited as long as being able to shoot a field, and a drone is used in the present embodiment. Agriculture support system 1 includes network 2, server apparatus 10, and drone 20.

Network 2 is a communication system including a mobile communication network, the Internet, and the like, and relays the exchange of data between devices accessing that system. Network 2 is accessed by server apparatus 10 through wired communication (or wireless communication), and by drones 20 through wireless communication.

Drone 20 is an aircraft that is a rotary-wing aircraft that includes one or more rotors and flies by rotating those rotors, in the present embodiment. Drone 20 includes a shooting function of shooting a field from the sky while flying. Drone 20 is carried to the field by a farmer who is the user of agriculture support system 1, and performs flying and shooting as a result of the farmer performing an operation to start a shooting flight. Server apparatus 10 is an information processing apparatus that performs processing relating to supporting a worker.

Server apparatus 10 performs processing of calculating the above-described NDVI from a video of the field shot by drone 20, for example. The NDVI indicates the growth conditions of the crop by a numerical value using a property that green leafs of plants absorb a large amount of red visible light and reflect a large amount of light having a wavelength in the near infrared region (0.7 µm to 2.5 µm). A worker can determine the timings of performing water sprinkling, fertilizer application, pesticide application, and the like to crops of the field in which the worker performs work with reference to the growth conditions indicated by the NDVI.

Figure 2:
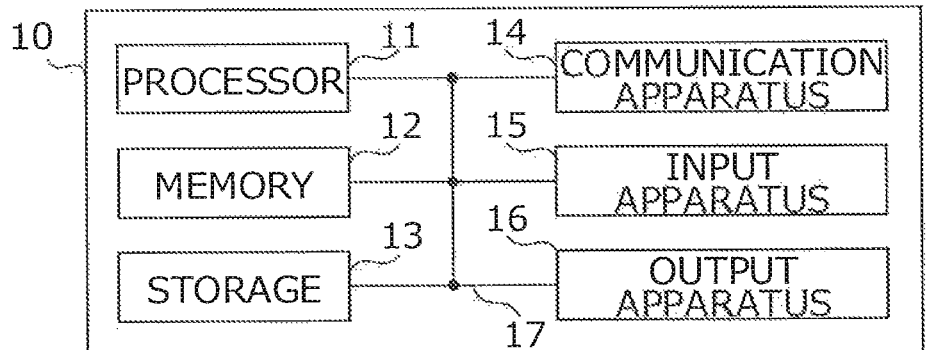
FIG. 2 is a diagram illustrating a hardware configuration of a server apparatus, in accordance with the present invention.

FIG. 2 is a diagram illustrating the hardware configuration of server apparatus 10. Server apparatus 10 is a computer that includes the following apparatuses, namely processor 11, memory 12, storage 13, communication apparatus 14, input apparatus 15, output apparatus 16, and bus 17. The term "apparatus" used here can be replaced with "circuit", "device", "unit", or the like. One or more of each apparatus may be included, and some apparatuses may be omitted.

Processor 11 controls the computer as a whole by running an operating system, for example. Processor 11 may be constituted by a central processing unit (CPU) including an interface with peripheral apparatuses, a control apparatus, a computation apparatus, registers, and the like. Additionally, processor 11 reads out programs (program code), software modules, data, and the like from storage 13 and/or communication apparatus 14 into memory 12, and then executes various types of processes in accordance therewith.

There may be one, or two or more, processors 11 that execute the various types of processes, and two or more processors 11 may execute various types of processes simultaneously or sequentially. Processor 11 may be provided as one or more chips. The programs may be transmitted from a network over an electrical communication line.

Memory 12 is a computer-readable recording medium, and may be constituted by at least one of ROM (Read Only Memory), EPROM (Erasable Programmable ROM), EEPROM (Electrically Erasable Programmable ROM), RAM (Random Access Memory), and so on, for example. Memory 12 may be called a "register", "cache", "main memory" (a main storage apparatus), or the like. Memory 12 can store the aforementioned programs (program code), software modules, data, and the like.

Storage 13 is a computer-readable recording medium, and may be constituted by at least one of an optical disk such as a CD-ROM (Compact Disc ROM), a hard disk drive, a flexible disk, a magneto-optical disk (e.g., a compact disk, a digital versatile disk, or a Blu-ray (registered trademark) disk), a smartcard, flash memory (e.g., a card, a stick, or a key drive), a Floppy (registered trademark) disk, a magnetic strip, and the like.

Storage 13 may be called an auxiliary storage apparatus. The aforementioned storage medium may be a database, a server, or another appropriate medium including memory 12 and/or storage 13, for example. Communication apparatus 14 is hardware for communicating between computers over a wired and/or wireless network (a transmission/reception device), and is also called a network device, a network controller, a network card, a communication module, and the like, for example.

Input unit apparatus 15 is an input device that accepts inputs from the exterior (e.g., a keyboard, a mouse, a microphone, a switch, a button, a sensor, or the like). Output apparatus 16 is an output device that makes outputs to the exterior (e.g., a display, a speaker, or the like). Note that input apparatus 15 and output apparatus 16 may be configured integrally (e.g., a touchscreen). The apparatuses such as processor 11 and memory 12 can access each other over bus 17, which is used for communicating information. Bus 17 may be constituted by a single bus, or may be constituted by buses that differ among the apparatuses.

Figure 3:
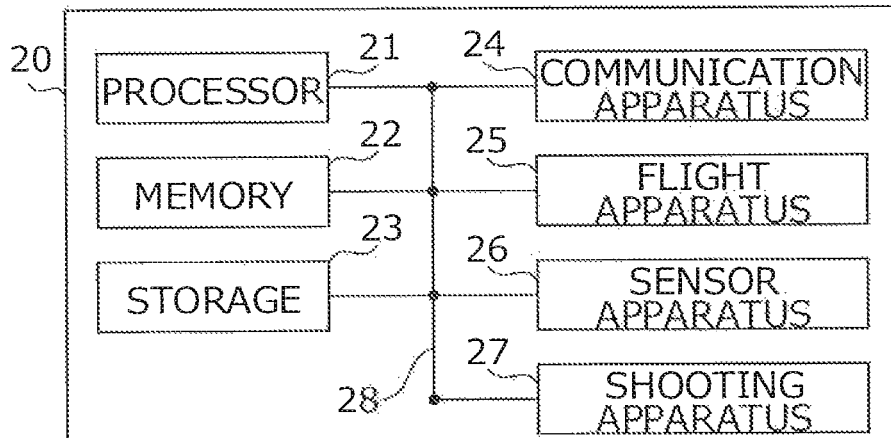
FIG. 3 is a diagram illustrating a hardware configuration of a drone, in accordance with the present invention.

FIG. 3 illustrates the hardware configuration of drone 20. Drone 20 is a computer including the following apparatuses, namely processor 21, memory 22, storage 23, communication apparatus 24, flight apparatus 25, sensor apparatus 26, shooting apparatus 27 and bus 28. The term "apparatus" used here can be replaced with "circuit", "device", "unit", or the like. One or more of each apparatus may be included, and some apparatuses may be omitted.

Processor 21, memory 22, storage 23, communication apparatus 24, and bus 28 are the same types of hardware as those having the same names that are shown in FIG. 2 (performance and specification need not be the same). Communication apparatus 24 can also perform, in addition to wireless communication with network 2, wireless communication with other drones. Flight apparatus 25 is an apparatus that includes a motor, a rotor, and the like and causes the drone to fly. Flight apparatus 25 can cause the drone to move in all directions, to stop (hovering), and the like, in the air.

Sensor apparatus 26 is an apparatus including a sensor group that obtains information necessary for flight control. Sensor apparatus 26 includes a position sensor that measures the position (latitude and longitude) of the drone, a direction sensor that measures the direction the drone is facing (a forward direction is defined for the drone, and the forward direction is the direction the drone is facing), an altitude sensor that measures the altitude of the drone, a speed sensor that measures the speed of the drone, and an inertial measurement unit (IMU) that measures the 3-axis angular velocity and the three directional acceleration.

Shooting apparatus 27 is a so-called digital camera that includes a lens, an image sensor, and the like, and records an image shot using the image sensor as digital data. This image sensor has a sensitivity to light having a wavelength in the near infrared region that is needed for calculating the NDVI, in addition to visible light. Shooting apparatus 27 whose shooting direction is fixed is attached to a lower portion of the casing of the drone (drone 20), and shoots a vertically downward direction while the drone is flying. Also, shooting apparatus 27 includes an auto focus function, but does not include a zoom function (that is, the angle of view is fixed) in the present embodiment.

Note that server apparatus 10, drones 20, and so on may be configured including hardware such as microprocessors, DSPs (Digital Signal Processors), ASICs (Application Specific Integrated Circuits), PLDs (Programmable Logic Devices), FPGA (Field Programmable Gate Arrays), and the like, and some or all of the function blocks may be realized by that hardware. For example, processor 11 may be provided as at least one of these types of hardware.

A program provided in the present system is stored in server apparatus 10 and drone 20 that are included in agriculture support system 1, and a function group described below is realized by a processor of each apparatus controlling the units by executing the program.

Figure 4:
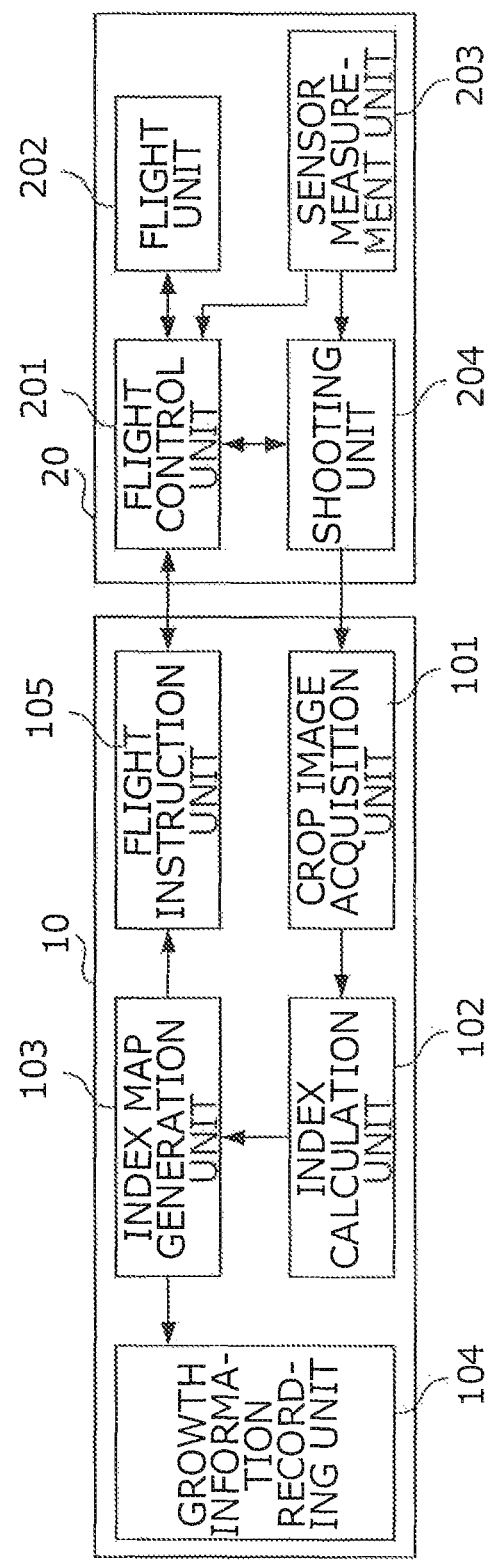
FIG. 4 is a diagram illustrating a configuration of functions realized by the agriculture support system, in accordance with the present invention.

FIG. 4 illustrates a functional configuration realized by agriculture support system 1. Server apparatus 10 includes crop image acquisition unit 101, index calculation unit 102, index map generation unit 103, growth information recording unit 104, and flight instruction unit 105.

Drone 20 includes flight control unit 201, flight unit 202, sensor measurement unit 203, and shooting unit 204. Flight control unit 201 controls the flight of the drone when shooting of a field is performed. Flight control unit 201 stores field range information (e.g., information regarding latitude and longitude that indicate outer edges of the field) that indicates the geographic range of a field that a farmer who is the user has registered in advance, for example, and performs control of causing the drone to fly in a flight path so as to thoroughly fly above the entirety of the field at a fixed altitude based on the field range information.

The flight path in this case is a path of flying, in the case of a rectangular field, for example, by drawing a wavelike trajectory from one side of the field to the other side that opposes the one side. In addition thereto, the path may be a path of flying by drawing a spiral trajectory, in which the flight is first performed along the outer edges of the field, after completing one round, the path is shifted inside and next one round is performed, and this operation is repeated. That is, the flight path needs only be a flight path of thoroughly flying the entirety of the field. Flight unit 202 has a function of causing the drone to fly, and in the present embodiment, causes the drone to fly by operating the motor, the rotor, and the like included in flying apparatus 25.

Sensor measurement unit 203 performs measurement by the sensors (position sensor, direction sensor, altitude sensor, speed sensor, and inertial measurement unit) included in sensor apparatus 26, and repeatedly measures the position, direction, altitude, speed, angular velocity, and acceleration of the drone at predetermined time intervals. Sensor measurement unit 203 supplies the sensor information indicating the measured position, direction, altitude, speed, angular velocity, and acceleration to flight control unit 201. Flight control unit 201 controls flight unit 202 based on the supplied sensor information, and causes the drone to fly along the above-described flight path.

Sensor measurement unit 203 supplies the sensor information indicating the measured position, direction, altitude, and speed to shooting unit 204. Shooting unit 204 has a function of shooting a subject using a shooting apparatus 27, and is an example of a "shooting function" of the present invention. When flight control unit 201 performs control so as to fly above a field, shooting unit 204 shoots the field as the subject. Shooting unit 204 shoots regions in which crops grow in the field (crop region). The image shot by shooting unit 204 is an example of an "image of a crop region" of the present invention.

The image sensor of shooting apparatus 27 has a sensitivity to light having a wavelength in the near infrared region, as described above, and therefore each pixel that forms a still image shot by shooting unit 204 is represented by, along with a pixel value (R) indicating red visible light, a pixel value (IR) indicating the light having a wavelength in the near infrared region. Shooting unit 204 shoots a plurality of still images so as to include all of the regions in the field based on the supplied sensor information.

Figure 5:
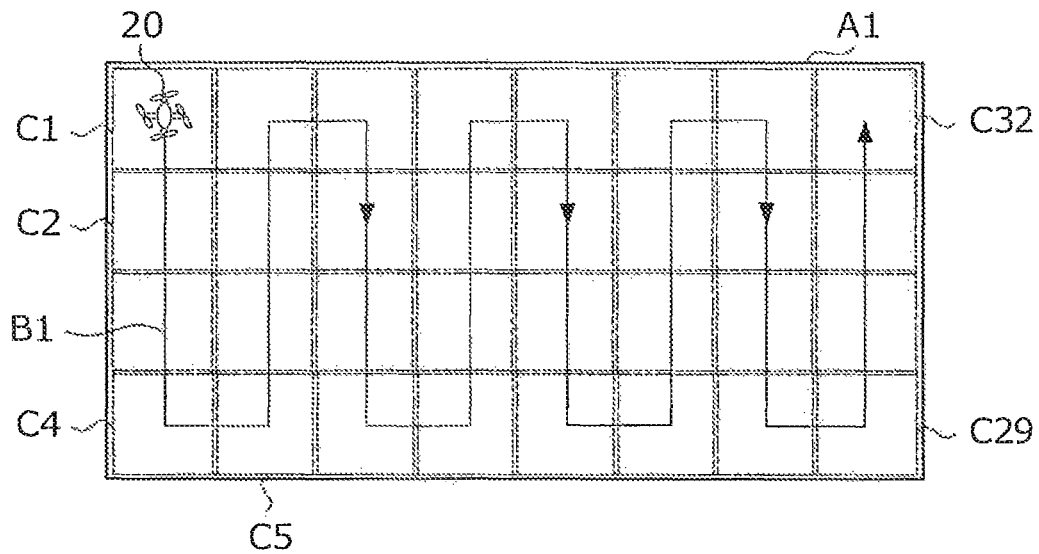
FIG. 5 is a diagram illustrating an example of a method of shooting a field, in accordance with the present invention.

FIG. 5 illustrates an example of a field shooting method. In FIG. 5, a path B1 is shown when drone 20 flies above a field A1 by drawing a wavelike trajectory. Shooting unit 204 calculates a shooting range (field range included in the angle of view) of the field (altitude at 0 m) from the altitude indicated by the sensor information and the angle of view of shooting apparatus 27. Also, shooting unit 204 performs next shooting when the ratio of the overlapped area between the current shooting range obtained by the speed and direction indicated by the sensor information and the previous shooting range (e.g., the percentage of the overlapped area when the area of the shooting range is defined as 100%) has decreased below a threshold value.

Shooting unit 204 first shoots, in the example in FIG. 5, a shooting region C1, and then shoots a shooting region C2 that overlaps the shooting region C1 by a small amount. Also, shooting unit 204 notifies flight control unit 201 of the size of the calculated shooting range when the drone (drone 20) makes a turn. Flight control unit 201 makes a turn by shifting the path by an overlapped distance such that the shooting ranges of the notified size overlap such as shooting regions C4 and C5 in FIG. 5, for example.

Shooting unit 204 obtains still images by shooting regions C1 to C32 shown in FIG. 5 by repeating shootings using this method, that is, shooting unit 204 shoots a plurality of still images whose shooting ranges overlap by a small amount. Note that in the example in FIG. 5, the field A1 has a size and a shape such that a plurality of shooting ranges are appropriately included, but the field may not have such a size and shape. In this case, all of the regions in the field can each be included in at least one still image by performing shooting by increasing the overlapped portion between the shooting ranges or including the outside area of the field.

Note that the shooting method used by shooting unit 204 is not limited thereto. For example, if the flight speed and flight altitude when performing shooting are determined, the time intervals at which the shooting ranges overlap as shown in FIG. 5 can be calculated in advance, and therefore the shooting need only be performed in such time intervals. Also, if the field map and the shooting positions are determined in advance, shooting unit 204 need only perform shooting when flying over the predetermined positions.

In addition thereto, a known method of shooting the ground using a drone may be used. The operations of the units included in drone 20 are started as a result of the farmer performing an operation to start flying. When the units start operating, drone 20 flies over the field in a set flight path, and shooting unit 204 repeatedly performs shooting, as described above. Shooting unit 204, upon performing shooting, creates image data indicating the shot still image and shooting information regarding the shooting (information indicating the position, orientation, altitude, and time when the shooting is performed), and transmits the image data to server apparatus 10.

Crop image acquisition unit 101 of server apparatus 10 acquires, by receiving the transmitted image data, the still image indicated by the image data as a crop region image shot by drone 20. Crop image acquisition unit 101 is an example of an "image acquisition unit" of the present invention. Also, crop image acquisition unit 101 also acquires shooting information indicated by the received image data, and supplies the shooting information to index calculation unit 102 along with the acquired still image.

Index calculation unit 102 calculates an index indicating the growth conditions of a crop shot in the image based on the image of the crop region acquired by crop image acquisition unit 101. Index calculation unit 102 is an example of a "calculation unit" of the present invention. Index calculation unit 102 calculates the above-described NDVI as the index indicating the growth conditions. Index calculation unit 102 calculates the NDVI by substituting the above-described red pixel value (R) and pixel value (IR) of light having a wavelength in the near infrared region in an equation of NDVI=(IR−R)/(IR+R), for each pixel of the still image, for example.

Index calculation unit 102 generates index information indicating the calculated NDVI in association with a pixel ID indicating the corresponding pixel, and supplies the index information to index map generation unit 103 along with the shooting information. The index information and the shooting information are supplied every time a crop region image is acquired, that is, drone 20 shoots a field image. Index map generation unit 103 generates an index map indicating the growth conditions of crops in the field based on the index (NDVI) calculated by index calculation unit 102.

The index map is information representing the index (NDVI) in each position or region in the field on the map. First, index map generation unit 103 generates an NDVI map in units of pixels representing the NDVI in the position in the field corresponding to each pixel.

Figure 6:
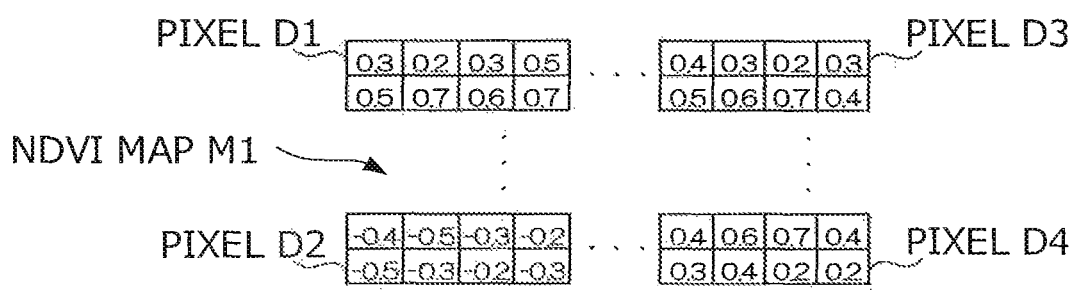
FIG. 6 is a diagram illustrating an example of an NDVI map in units of pixels, in accordance with the present invention.

FIG. 6 illustrates an example of the NDVI map in units of pixels. In the example in FIG. 6, an NDVI map M1 of the field A1 shown in FIG. 5 in units of pixels is shown.

The NDVI map M1 is a rectangular map having a pixel D1 at the upper left corner, a pixel D2 at the lower left corner, a pixel D3 at the upper right corner, and a pixel D4 at the lower right corner, at the corners. "0.3" shown in the pixel D1 is the NDVI in the pixel, at the upper left corner, of the image of the shooting region C1 at the upper left corner shown in FIG. 5, and "−0.5" shown in the pixel D2 is the NDVI in the pixel, at the lower left corner, of the image of the shooting region C4 at the lower left corner shown in FIG. 5.

"0.2" shown in the pixel D4 is the NDVI in the pixel, at the lower right corner, of the image of the shooting region C29 at the lower right corner shown in FIG. 5, and "0.3" shown in the pixel D3 is the NDVI in the pixel, at the upper right corner, of the image of the shooting region C32 at the upper right corner shown in FIG. 5. Pixels indicating an overlapped portion of adjacent shooting regions are included in the NDVI map M1. Index map generation unit 103, with respect to each of these pixels, uses an average value of the NDVI of the pixel (pixel indicating the same point in the field A1) that is calculated from still images obtained by shooting the shooting regions.

The NDVI map M1 is completed by drone 20 having shot the shooting region C32 and the units performing the above operations. Index map generation unit 103 generates, in the present embodiment, an NDVI map in units of regions indicating the growth conditions of the crop in each of the plurality of regions obtained by sectioning the field A1, from the NDVI map M1 in units of pixels that has been generated in this way.

Figure 7:
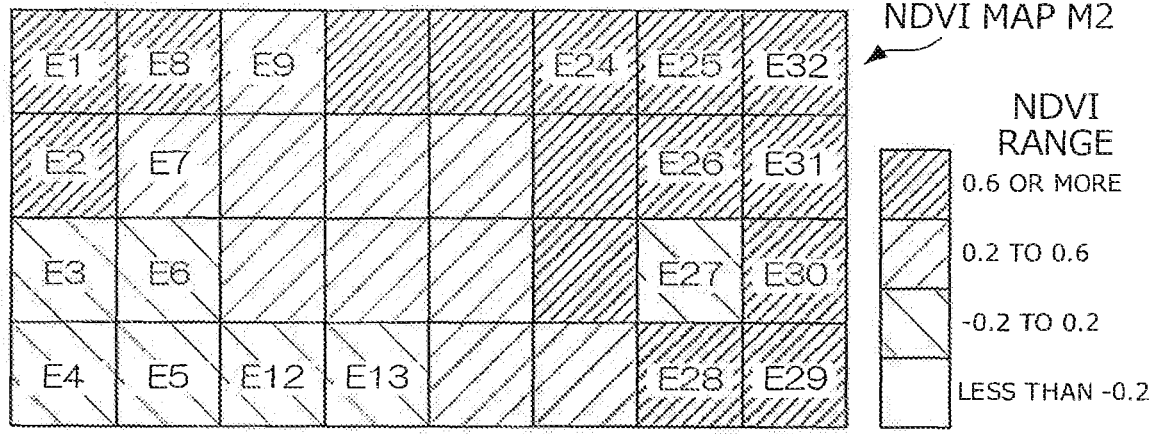
FIG. 7 is a diagram illustrating an example of an NDVI map in units of regions, in accordance with the present invention.

FIG. 7 shows an example of the NDVI map in units of regions. In the example in FIG. 7, sectional regions E1 to E32 corresponding to the shooting region C1 to C32 shown in FIG. 5 are shown.

Each sectional region is applied with a pattern according to the size of the NDVI average value. For example, the sectional regions E1, E2, and E8 are applied with a pattern indicating that the NDVI average value is 0.6 or more. Similarly, the sectional regions E7, E9, and the like are applied with a pattern indicating that the NDVI average value is 0.2 or more and less than 0.6, and the sectional regions E3, E4, and the like are applied with a pattern indicating that the NDVI average value is −0.2 or more and less than 0.2.

Index map generation unit 103 supplies the generated NDVI map in units of pixels and NDVI map in units of regions to growth information recording unit 104 in association with the shooting information, and the shooting date and time of the images from which these maps are generated. Growth information recording unit 104 records these index maps generated by index map generation unit 103 as the growth information (information indicating the growth conditions of a crop) described above.

Growth information recording unit 104 retains the recorded growth information in a state in which the user (farmer) can read (being put on a web page that is accessible by a URL (Uniform Resource Locator) that the user is notified of, for example). The recorded growth information can also be downloaded from a terminal that is used by the user. The user downloads the growth information, confirms the change in the growth conditions in the field A1, and uses for determining the periods of performing farm work such as water sprinkling, fertilizer application, pesticide application, harvesting, and the like.

Index map generation unit 103 supplies the generated NDVI map in units of regions to flight instruction unit 105. The supplying of the NDVI map is performed after ending shooting of all the shooting regions, that is, after the first shooting is ended. Flight instruction unit 105 makes an instruction regarding a second shooting flight to drone 20 that has ended the first shooting. Flight instruction unit 105 is an example of an "instruction unit" of the present invention.

Specifically, if a portion regarding which the index calculated by index calculation unit 102 is less than a predetermined threshold (index threshold) (this portion is also referred to as a "low index region" in the following) is present in the crop region, flight instruction unit 105 instructs drone 20 to shoot the low index region while increasing the resolution of the crop image. The NDVI calculated regarding the low index region indicates that the growth of the crop is delayed.

However, an error may occur in the NDVI depending on the shot image, and therefore does not necessarily indicate that the growth of the crop is actually delayed. Therefore, flight instruction unit 105 makes an instruction of performing a second shooting while increasing the resolution of the crop image such that an image with which the NDVI can be calculated at a higher accuracy can be shot. The resolution of a crop image is represented by the number of pixels representing a unit area (e.g., one square meter) of the crop region in an image of the crop region in which crops are grown, for example.

As the resolution of the crop image decreases, the number of pixels showing a crop and a substance other than the crop (such as soil, water surface, and the like) in a mixed manner increases, and therefore the accuracy of the NDVI value calculated from light reflected from the crop decreases. In contrast, as the resolution of the crop image increases, the number of pixels showing only the crop increases, and therefore the accuracy of the NDVI value increases. In the present embodiment, if a region regarding which the NDVI average value is less than 0.2 (index threshold described above) is present in the sectional regions shown in the supplied NDVI map, flight instruction unit 105 determines that the sectional region is the low index region.

In the example in FIG. 7, the NDVI average values of the sectional regions E3, E4, E5, E6, E12, E13, and E27 are less than 0.2, and therefore flight instruction unit 105 determines that low index regions are present in the crop region. In the present embodiment, flight instruction unit 105 makes an instruction to shoot the low index region while performing a flight at an altitude lower than that when the image from which the index of the low index region has been calculated has been shot. As the flight altitude is reduced, the shooting range becomes narrower, and the number of pixels representing a unit area of the crop region increases, and as a result, the resolution of the above-described crop image increases. Accordingly, making an instruction to perform a flight at a low altitude is also making an instruction to shoot the low index region while increasing the resolution.

Specifically, flight instruction unit 105 generates a flight path that passes above all of the sectional regions indicated as the low index regions in the supplied NDVI map in units of regions and returns to the shooting start point at an altitude lower than that at the first shooting. Also, flight instruction unit 105 transmits the instruction data for instructing the flight through the generated flight path and performing shooting of the sectional regions that are low index regions, that is, for instructing a second shooting flight, to drone 20.

Note that flight instruction unit 105, upon determining that no low index region is present in the crop region, transmits instruction data for instructing to make a flight through a flight path for returning to base, that is, for directly returning to the shooting start point (return to base flight) to drone 20 instead of instructing the second shooting flight. When the first shooting flight is ended, flight control unit 201 of drone 20 stands by (makes hovering) at an end position (above the shooting region C32 in the example in FIG. 5), and waits for instruction data from server apparatus 10.

Note that, if the waiting time exceeds a predetermined time, flight control unit 201 may transmit requesting data for requesting an instruction to server apparatus 10. In this case, flight instruction unit 105 transmits, to drone 20, instruction data if the determination regarding the low index region has been completed, and transmits instruction data for instructing a return to base flight if not, for example. Flight control unit 201, upon receiving the instruction data, causes the drone to fly to the shooting start point through the flight path indicated by the instruction data.

Figure 8:
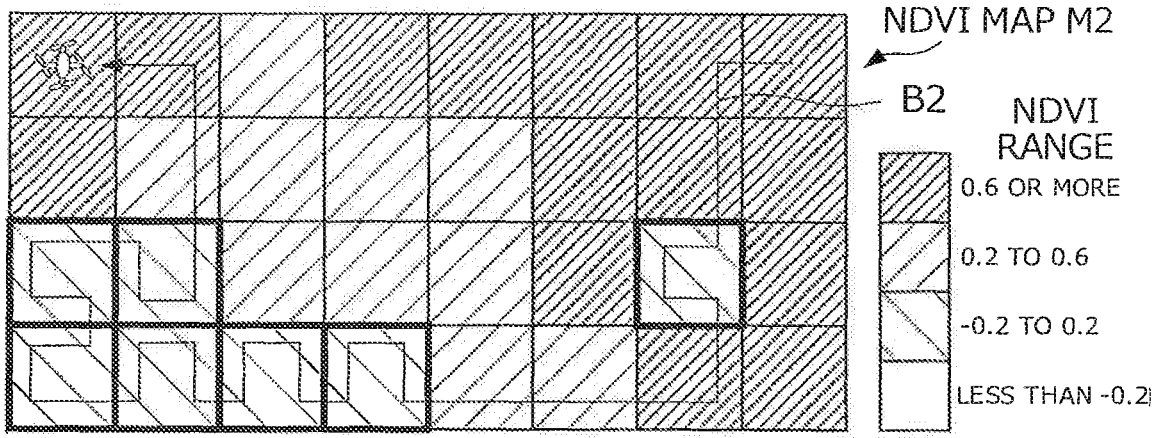
FIG. 8 is a diagram illustrating an example of a flight path of a second shooting flight, in accordance with the present invention.

FIG. 8 shows an example of the flight path in the second shooting flight. In the example in FIG. 8, drone 20 flies from the sectional region E32 shown in FIG. 7 to the sectional region E27, which is a low index region, and flies above the sectional region E27. Here, in the second shooting flight, the flight altitude is lowered, and therefore the shooting range is reduced to a quarter of that in the first flight, for example.

Therefore, flight instruction unit 105 instructs a shooting flight for shooting each divided region by flying over each of the divided regions obtained by dividing the sectional region E27 into four. Flight instruction unit 105 instructs a shooting flight through a flight path B2 that similarly passes over other sectional regions that are low index regions. Flight control unit 201 causes the drone to fly through this flight path B2, and shooting unit 204 shoots these sectional regions, and as a result, images obtained by shooting each sectional region that is a low index region is acquired by crop image acquisition unit 101.

Thereafter, calculation of the index (NDVI) by index calculation unit 102 and the generation of an index map by index map generation unit 103 are performed. Here, index map generation unit 103 may generate an index map indicating the growth conditions for each shot divided region, but generates an index map indicating the growth conditions for each sectional region, similarly to the first shooting, in order to make the comparison with the index map generated only by the first shooting easy.

When the second shooting described above has been performed, the resolution of the crop image increases, and therefore it is possible that the sectional region determined as a low index region in the first shooting is determined not as the low index region, as a result of an NDVI representing a more actual state being calculated.

Figure 9:
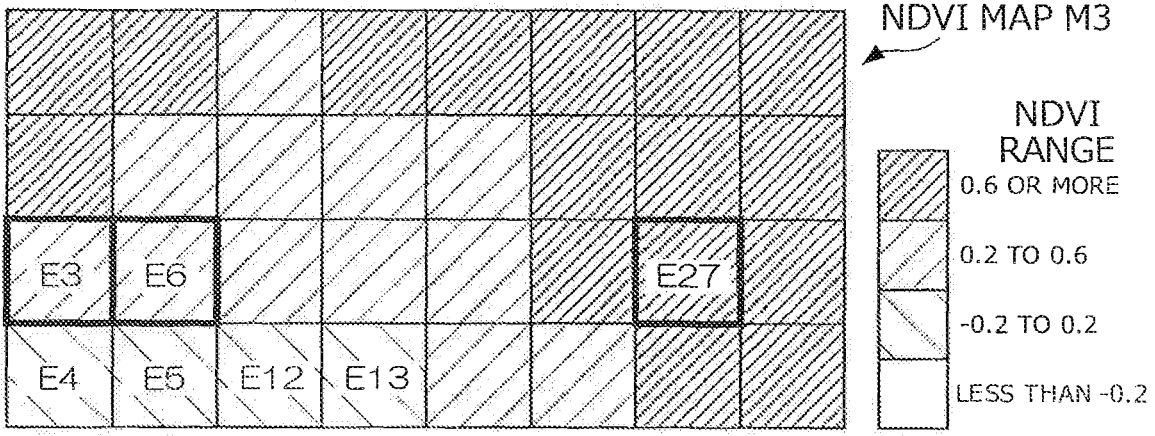
FIG. 9 is a diagram illustrating an example of a second NDVI map in units of regions, in accordance with the present invention.

FIG. 9 shows an example of the second NDVI map in units of regions. In the example in FIG. 9, an NDVI map M3 is illustrated in which the sectional regions E3, E6, and E27 determined as the low index regions in FIG. 7 are changed to sectional regions that are determined not as the low index regions.

Growth information recording unit 104 records the second NDVI map in units of pixels and the second NDVI map in units of regions as the growth information. Here, growth information recording unit 104 overwrites the growth information generated in the first shooting (e.g., NDVI map M2 in units of regions shown in FIG. 7) with the growth information generated in the second shooting (e.g., NDVI map M3 in units of regions shown in FIG. 9) (both pieces of information may be recorded without performing overwriting). With this, only the growth information whose accuracy is higher is recorded.

The apparatuses included in the agriculture support system 1 performs recording processing of recording crop growth information based on the configuration described above.

Figure 10:
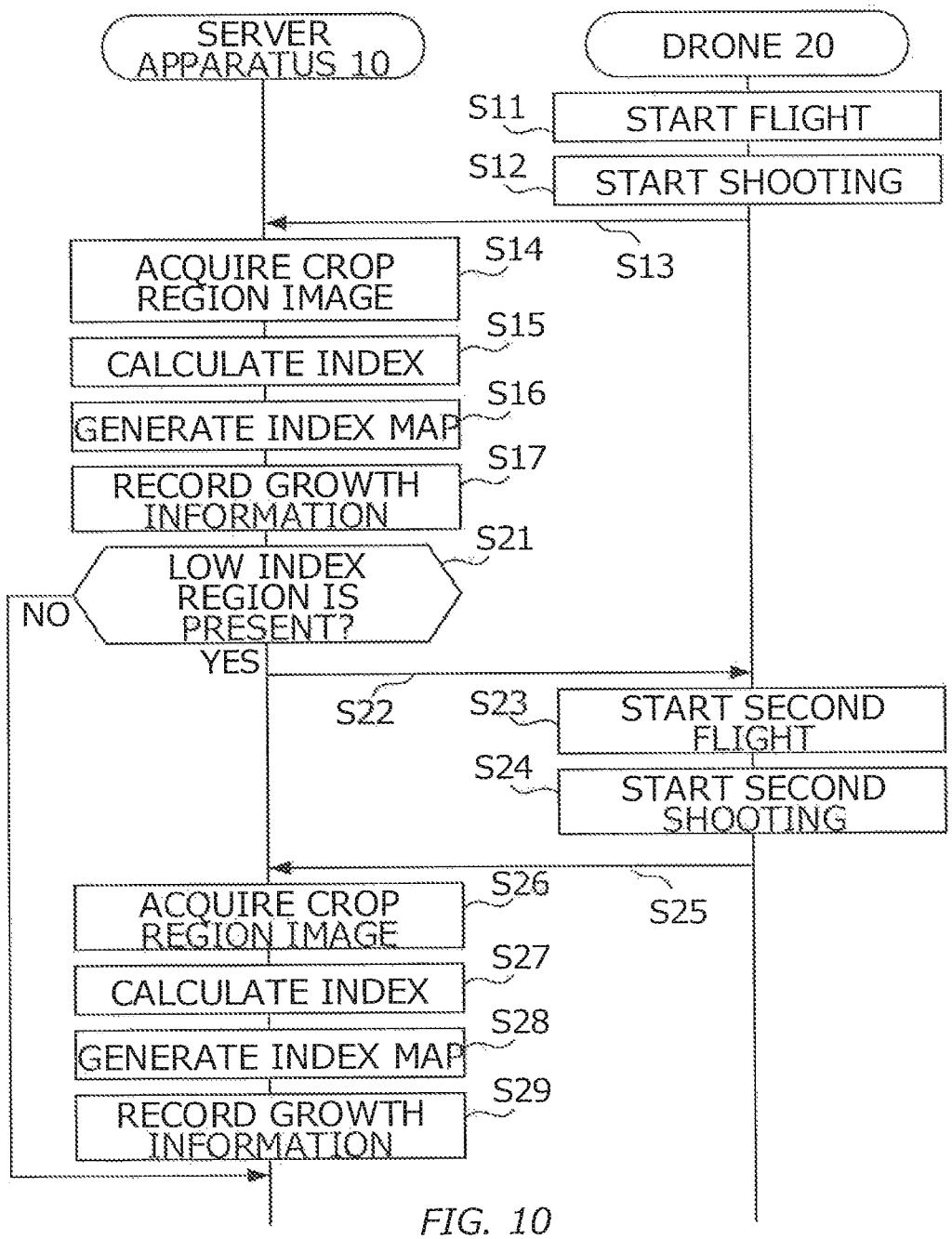
FIG. 10 is a diagram illustrating an example of operating procedures of the apparatuses in recording processing, in accordance with the present invention.

FIG. 10 shows an example of the operating procedure of each apparatus in the recording processing. This operating procedure is started by the user performing an operation to start the shooting flight of drone 20 as a trigger. First, drone 20 (flight control unit 201, flight unit 202, and sensor measurement unit 203) starts flying above the field based on the stored field range information (step S11).

Next, drone 20 (shooting unit 204) starts the shooting of each shooting region from above the field (step S12), generates image data indicating the shot still image and the shooting information (information indicating the position, orientation, and altitude when shooting is performed) every time the shooting is performed, and transmits the image data to server apparatus 10 (step S13). Server apparatus 10 (crop image acquisition unit 101) acquires the still image indicated by the transmitted image data as the crop region image (step S14).

Next, server apparatus 10 (index calculation unit 102) calculates the index (NDVI) indicating the growth conditions of the crop shot in the image based on the acquired crop region image (step S15). Next, server apparatus 10 (index map generation unit 103) generates the index map indicating the growth conditions of the crop in the field based on the calculated indices (step S16). Next, server apparatus 10 (growth information recording unit 104) records the generated index map as the growth information (step S17).

Next, server apparatus 10 (flight instruction unit 105) determines whether or not a low index region is present in the crop region based on the index map generated in step S16 (step S21). If it is determined that a low index region is not present in step S21 (NO), server apparatus 10 ends this operating procedure. If it is determined that a low index region is present in step S21 (YES), server apparatus 10 (flight instruction unit 105) transmits instruction data for making an instruction to shoot the low index region while increasing the resolution to drone 20 (step S22).

Drone 20 (flight control unit 201, flight unit 202, and sensor measurement unit 203) starts a second flight according to the instruction indicated by the transmitted instruction data (step S23). Next, drone 20 (shooting unit 204) starts the second shooting (step S24), generates image data every time shooting is performed, and transmits the image data to server apparatus 10 (step S25). Server apparatus 10 (crop image acquisition unit 101) acquires the still image indicated by the image data transmitted second time as the crop region image (step S26).

Next, server apparatus 10 (index calculation unit 102) calculates the second index (NDVI) based on the acquired crop region image (step S27). Next, server apparatus 10 (index map generation unit 103) generates a second index map based on the calculated indices (step S28). Also, server apparatus 10 (growth information recording unit 104) records the generated second index map as the growth information (step S29), and ends this operating procedure.

As the flight altitude when field shooting is performed increases, the shooting range increases and the flight time can be shortened. On the other hand, as the shooting range increases, the resolution of the crop image decreases, and the accuracy of the NDVI decreases. In the present embodiment, as a result of shortening the flight time of drone 20 that shoots the crops by increasing the flight altitude in the first shooting, and increasing the resolution of the crop image in the second shooting, the accuracy of the NDVI obtained from the shot images can be increased.

If there is a puddle in the field or the field is a rice paddy, sunlight reflected on a water surface is incident on the lens of the digital camera, which may be a factor of incurring an error when the NDVI is calculated due to extremely bright pixels being included in the shot image. This reflected light is incident not only from direction in which the sun is present viewed from drone 20, but also from various directions if the water surface waves. In the present embodiment, the shooting range is narrowed by reducing the flight altitude in the second shooting relative to the first shooting, and therefore the amount of reflected light that is incident on the lens decreases, and in this regard as well, the accuracy of the NDVI can be increased.

2. Modifications

The embodiment described above is merely an example of implementation of the present invention, and may also be modified as follows. Also, the embodiment and the modifications may be combined as necessary. In this case, implementation may be performed after the modifications are prioritized (after ranking, that is to say determining, which of the modifications is prioritized when competing events occur when the modifications are implemented).

Also, as a specific combination method, modifications that use different parameters for obtaining a common value or the like (a value, a change amount, an index or the like, e.g., an index threshold, its change amount, accuracy of the NDVI, or the like) may be combined, and the common value or the like may be obtained by using these parameters together, for example. Also, one value or the like may be obtained by adding separately obtained values following some rule. Also, when these operations are performed, different weights may be given to the parameters to be used.

2-1. Sectional Region

In the embodiment, index map generation unit 103 uses the region corresponding to a shooting range as the sectional region, and generates an NDVI map in units of regions, but the sectional region is not limited thereto. For example, a plurality of shooting ranges may be handled as one sectional region, or a region corresponding to a divided region obtained by dividing one shooting region into a plurality of pieces may be handled as the sectional region. Also, the shapes and sizes of the sectional regions may be the same or not the same.

2-2. Index Accuracy

In the embodiment, the index threshold is fixed, but the index threshold may be dynamically changed.

Figures 11, 12, 13, 14:
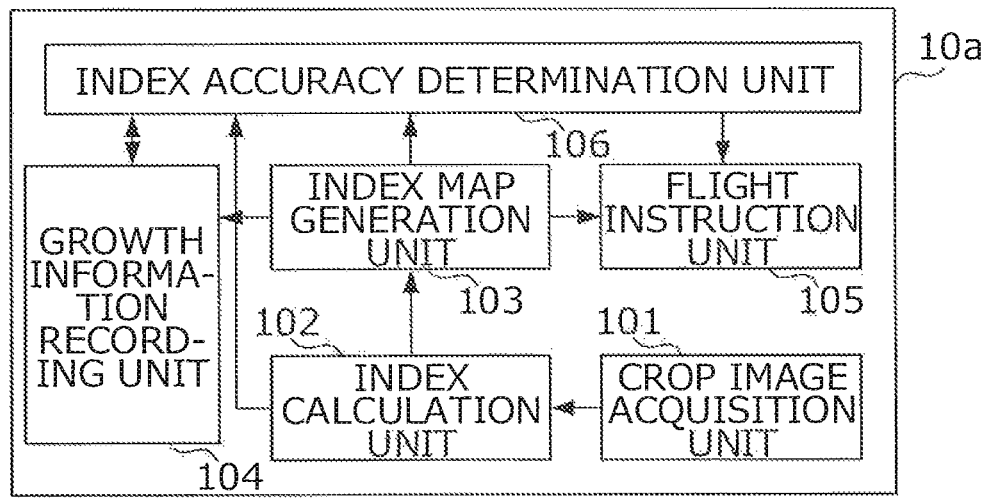
FIG. 11 is a diagram illustrating a configuration of functions realized in a modification, in accordance with the present invention.
FIG. 12 is a diagram illustrating an example of an accuracy table, in accordance with the present invention.
FIG. 13 is a diagram illustrating an example of a threshold table, in accordance with the present invention.
FIG. 14 is a diagram illustrating an example of another accuracy table, in accordance with the present invention.

FIG. 11 illustrates the functional configuration realized by this modification. FIG. 11 illustrates server apparatus 10a including index accuracy determination unit 106 in addition to the units shown in FIG. 4.

Index accuracy determination unit 106 determines the accuracy of an index calculated by index calculation unit 102. Index accuracy determination unit 106 is an example of a "determination unit" of the present invention. Pixel values (IR, R) used for calculating the NDVI are supplied from index calculation unit 102 to index accuracy determination unit 106, for example. Index accuracy determination unit 106 determines the index accuracy based on the size of the supplied pixel values.

For example, in the case of IR=20 and R=10, and in the case of IR=200 and the R=100 as well, the NDVI is 10/30 or 100/300, and is 0.333 . . . . If an error of 10 occurs in each of these pixel values, in the case of IR=30 and IR=20, NDVI=10/50=0.2, and in the case of IR=210 and R=110, NDVI=100/320=0.312 . . . . In this way, regarding the NDVI, as the pixel values of IR and R decrease, a small error in these pixel values appear as a larger error in the NDVI.

Index accuracy determination unit 106 determines the accuracy using an accuracy table in which an average value of the pixel values of IR and R is associated with the NDVI accuracy.

FIG. 12 shows an example of the accuracy table. In the example in FIG. 12, the average values of the pixel values of "less than Ave1", "Ave1 or more and less than Ave2", and "Ave2 or more" are respectively associated with the NDVI accuracies of "low", "medium", and "high".

Index accuracy determination unit 106 determines the accuracy associated with the average value of the supplied pixel values in the accuracy table, as the accuracy of the index calculated by index calculation unit 102. In this case, index accuracy determination unit 106 determines that the larger the average value of the supplied pixel values is, the higher the NDVI accuracy is. Index accuracy determination unit 106 notifies the flight instruction unit 105 of the accuracy determined in this way.

Flight instruction unit 105 uses a larger value as the index threshold, as the accuracy determined by index accuracy determination unit 106 decreases. Flight instruction unit 105 determines the index threshold using a threshold table in which the index accuracy is associated with the index threshold. FIG. 13 shows an example of the threshold table. In the example in FIG. 13, the NDVI accuracies of "high", "medium", and "low" are respectively associated with the index thresholds of "Th1", "Th2", and "Th3" (Th1<Th2<Th3).

Flight instruction unit 105 determines the index threshold associated with the accuracy notified from index accuracy determination unit 106 in the threshold table as the index threshold used when determining whether or not a low index region is present. Flight instruction unit 105 notifies index map generation unit 103 of the determined index threshold. Index map generation unit 103 generates an NDVI map in units of regions in which the sectional regions regarding which the NDVI is less than the notified index threshold are shown, and supplies the NDVI map to flight instruction unit 105.

Flight instruction unit 105 determines whether or not a low index region is present using the NDVI map in units of regions that is supplied in this way, and thereafter makes instructions similarly to the embodiment. In this way, in this modification, when the NDVI accuracy to be calculated is estimated to be low, the determination that the second shooting is to be performed is easier to be made by increasing the index threshold. Accordingly, compared with the case where the index threshold is fixed, growth information indicating more accurate growth conditions can be recorded.

On the other hand, in this modification, when the NDVI accuracy to be calculated is estimated to be high, the determination that the second shooting is to be performed is not easily made by decreasing the index threshold. Accordingly, compared with the case where the index threshold is fixed, the time needed to shoot the crop region can be reduced while suppressing the reduction of accuracy of the growth information. Note that the determination method of the index accuracy is not limited to the above-described method, and a method of making determination based on the difference from an index calculated in the past may also be used, for example.

In this case, the NDVI map in units of regions is supplied to index accuracy determination unit 106 from index map generation unit 103. Index accuracy determination unit 106 reads out the NDVI map in units of regions recorded regarding the same field as the supplied NDVI map from growth information recording unit 104. Index accuracy determination unit 106 calculates, for each sectional region, the difference between the average value of the indices of the sectional region shown in the NDVI map that is recorded when the previous shooting has been performed and the average value of the indices of the sectional region shown in the NDVI map that is generated in this shooting, and calculates the average value of the differences, for example.

Index accuracy determination unit 106 determines the accuracy using an accuracy table in which the average value of the differences is associated with the NDVI accuracy.

FIG. 14 shows another example of the accuracy table. In the example in FIG. 14, the average values of the differences of "less than Dif1", "Dif1 or more and less than Dif2", and "Dif2 or more" are respectively associated with the NDVI accuracies of "high", "medium", and "low". Index accuracy determination unit 106 determines that the larger the calculated average value of the differences is, the lower the NDVI accuracy is, by using this accuracy table.

Thereafter, flight instruction unit 105 determines whether or not a low index region is present while using a larger value as the index threshold, as the accuracy determined by index accuracy determination unit 106 decreases, similarly to the above-described method. In this case as well, compared with the case where the index threshold is fixed, growth information indicating more accurate growth conditions can be recorded, and the time needed to shoot the crop region can be reduced while suppressing the reduction of accuracy of the growth information.

Also, when a sectional region that is smaller than the shooting region is used, as described in the above modification, a method of determining the index accuracy based on the degree of separation from the center of the shot image may also be used. In this case, index map generation unit 103 supplies the NDVI map in units of regions and information indicating the sectional regions regarding which an image used to calculate the NDVI is the same to index accuracy determination unit 106. Index accuracy determination unit 106 determines that the NDVI accuracy of each sectional region included in the supplied NDVI map decreases as the distance of the sectional region from the center of the shot image increases.

FIG. 15 shows an example of the sectional regions regarding which the shooting region is the same. In FIG. 15, sectional regions E111 to E119 are shown that are arranged in three columns vertically and three rows horizontally. In this case, index accuracy determination unit 106 determines that the NDVI accuracy at the sectional region E115 at the center is "high", the NDVI accuracies of the sectional regions E112, E114, E116, and E118 that are horizontally and vertically adjacent to the sectional region E115 are "medium", and the NDVI accuracies of the sectional regions E111, E113, E117, and E119 positioned at the corners are "low".

In an image shot by a digital camera such as shooting apparatus 27, the difference from the original image increases as separating from the center of the screen caused by phenomena such as barrel distortion in which peripheral portions of the screen bulges, pincushion distortion in which peripheral portions of the screen sink in a pincushion shape, and vignetting in which peripheral portions of the screen darkens. Therefore, as a result of determining the NDVI accuracies as in the example in FIG. 15, the determination that the second shooting is to be performed is easier to be made with respect to the sectional regions whose accuracy is low, and therefore growth information indicating more accurate growth conditions can be recorded.

2-3. Possible Flight Distance

A method different from the above-described modification may be used as a method of dynamically changing the index threshold.

Figures 16, 17:
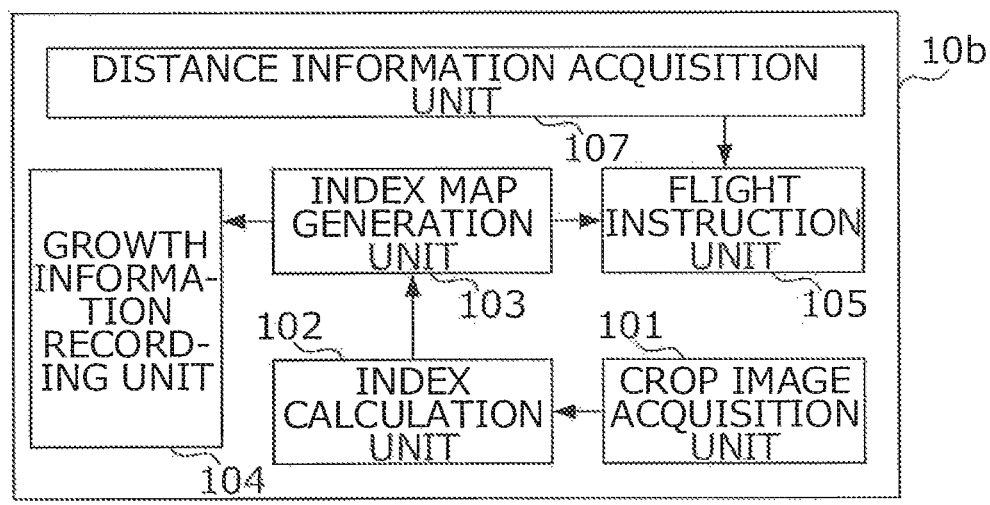
FIG. 16 is a diagram illustrating a configuration of functions realized in a modification, in accordance with the present invention.
FIG. 17 is a diagram illustrating an example of a threshold table, in accordance with the present invention.

FIG. 16 shows a functional configuration realized by this modification. In FIG. 16, server apparatus 10b including distance information acquisition unit 107 is shown in addition to the units shown in FIG. 4. Distance information acquisition unit 107 acquires information indicating a remaining possible flight distance of drone 20. Distance information acquisition unit 107 is an example of a "distance acquisition unit" of the present invention.

Regarding the remaining possible flight distance, when the possible flight distance when a battery is 100% charged is 3000 m, if the remaining battery capacity is 50%, 1500 m is taken as the remaining possible flight distance, for example. In this modification, when drone 20 enters a state of waiting for instruction data after ending the first shooting, sensor measurement unit 203 measures the remaining battery capacity, and shooting unit 204 transmits remaining capacity data indicating the remaining battery capacity when transmitting image data.

Distance information acquisition unit 107 stores, in advance, the possible flight distance when the battery of drone 20 is 100% charged, and acquires the distance by multiplying the possible flight distance by the ratio of the remaining capacity indicated by the transmitted remaining capacity data as the information indicating the remaining possible flight distance. Distance information acquisition unit 107 supplies distance information indicating the acquired remaining possible flight distance to flight instruction unit 105. Flight instruction unit 105 uses a larger value as the index threshold, as the possible flight distance indicated by the distance information acquired by distance information acquisition unit 107 increases.

Flight instruction unit 105 determines the index threshold using a threshold table in which the possible flight distance is associated with the index threshold.

FIG. 17 shows an example of the threshold table. In the example in FIG. 17, the possible flight distances of "less than Dis1", "Dis1 or more and less than Dis2", and "Dis2 or more" are respectively associated with index thresholds of "Th1", "Th2", and "Th3" (Th1<Th2<Th3).

Flight instruction unit 105 determines a low index region regarding which second shooting is to be performed using the index threshold associated, in the threshold table, with the possible flight distance indicated by the distance information supplied from distance information acquisition unit 107, and makes an instruction to shoot the determined low index region. Accordingly, as the remaining possible flight distance when the first shooting is ended increases, the areas regarding which second shooting is to be performed increases, and therefore the flight distance of the second shooting flight tends to increase. As a result, although the remaining battery capacity when the second shooting flight is ended decreases, a large number of images with high accuracy can be shot in an amount corresponding to the increased flight distance, and as a result, growth information indicating more accurate growth conditions can be recorded.

Note that the method of acquiring the distance information is not limited to the method described above. For example, the configuration may be such that drone 20 calculates a remaining possible flight distance from the remaining capacity of the battery of the drone, and distance information acquisition unit 107 acquires the calculated possible flight distance. Also, remaining capacity information indicating the remaining battery capacity may be used as the distance information, without calculating the possible flight distance. In this case, flight instruction unit 105 may determine the index threshold using a threshold table in which the remaining capacity information is associated with the index threshold. Also, in addition thereto, information indicating the wind speed and the wind direction of the area including the field may also be used as the distance information.

In this case, flight instruction unit 105 divides the flight path of the second shooting flight by the direction, and corrects the possible flight distance considering the influence of the wind on the flight in each direction (decreases in the case of an against wind, and increases in the case of a following wind), for example. Flight instruction unit 105 determines the low index regions regarding which second shooting is to be performed using the index threshold that is associated with the corrected possible flight distance in the threshold table. Accordingly, a situation in which the remaining battery capacity becomes insufficient does not easily occur in the second shooting flight, compared with a case where information regarding the wind is not considered.

2-4. Density of Low Index Region

A method different from the above-described modifications may be used as the method of dynamically changing the index threshold. In this modification, index map generation unit 103 generates the NDVI map in units of regions using a provisional threshold as the index threshold.

FIGS. 18A to 18D show examples of the NDVI map in units of regions of this modification. In FIGS. 18A to 18D, sectional regions (low index region) regarding which the NDVI is less than the index threshold are applied with a pattern. In the example in FIG. 18A, sectional regions E5, E15, and E27 are low index regions, and in the example in FIG. 18B, sectional regions E6, E12, and E14 are low index regions. Index map generation unit 103 supplies the NDVI map in units of regions that is generated using the provisional threshold to flight instruction unit 105.

When a provisional threshold is determined as the index threshold, flight instruction unit 105 uses a larger value as the index threshold in place of the provisional threshold, as the positional deviation of portions (low index regions) regarding which the index is less than the provisional threshold increases. Flight instruction unit 105 determines the size of the positional deviation as follows, for example. Flight instruction unit 105 determines a region surrounded by a rectangular that circumscribes all of the low index regions (a region F1 in FIG. 18A, and a region F2 in FIG. 18B), and calculates the density of the low index region in this region.

In the case of the region F1, the density is $3/18=1/6$, and in the case of the region F2, the density is $3/6=1/2$. Flight instruction unit 105 determines that the larger the value of this density is, the more the low index regions are concentrated in a specific region, that is, the larger the positional deviation of the low index regions is. Flight instruction unit 105 determines the index threshold using a threshold table in which a value (deviation value) indicating the positional deviation of the low index regions is associated with the index threshold.

FIG. 19 shows an example of the threshold table. In the example in FIG. 19, deviation values of "less than 0.25", "0.25 or more and less than 0.5", and "0.5 or more" are respectively associated with index thresholds of "Th1", "Th2", and "Th3" (Th1<Th2<Th3). Flight instruction unit 105 determines the low index regions that are to be shot in the second shooting using the index threshold associated with the density value (deviation value) in the threshold table in place of the provisional threshold, and makes an instruction to shoot the determined low index regions.

If the index threshold is increased relative to the provisional threshold, the low index region is likely to extend to the surrounding area. For example, assume that a sectional region adjacent to a low index region that is determined when the provisional threshold is used becomes a low index region. FIG. 18C shows an NDVI map when the low index regions shown in FIG. 18A extend to adjacent sectional regions, and FIG. 18D shows an NDVI map when the low index regions shown in FIG. 18B extend to adjacent sectional regions.

Figure 18A:
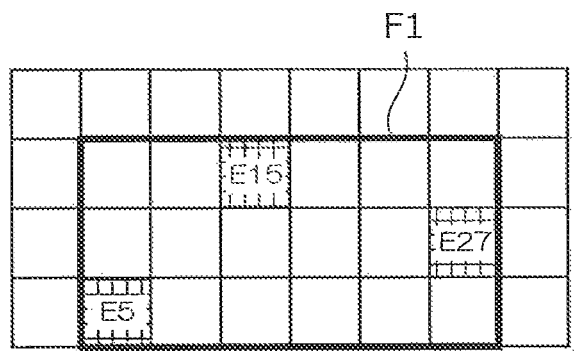
FIG. 18A is a diagram illustrating an example of an NDVI map in units of regions in a modification, in accordance with the present invention.
Figure 18B:
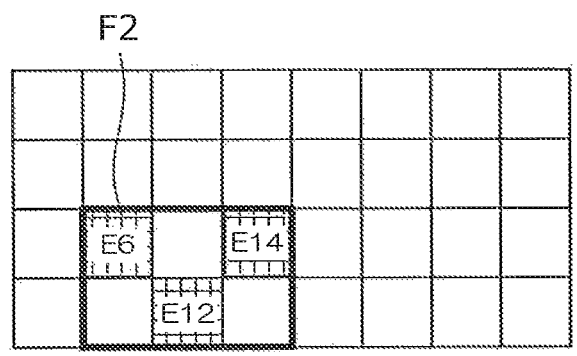
FIG. 18B is a diagram illustrating an example of the NDVI map in units of regions in the modification, in accordance with the present invention.
Figure 18C:
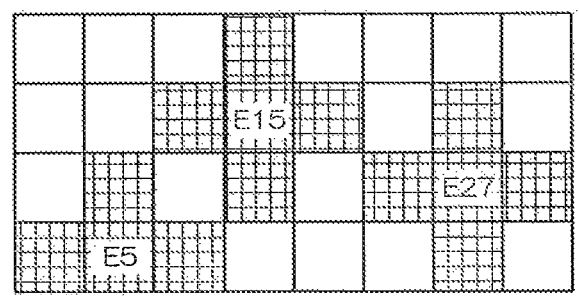
FIG. 18C is a diagram illustrating an example of the NDVI map in units of regions in the modification, in accordance with the present invention.
Figure 18D:
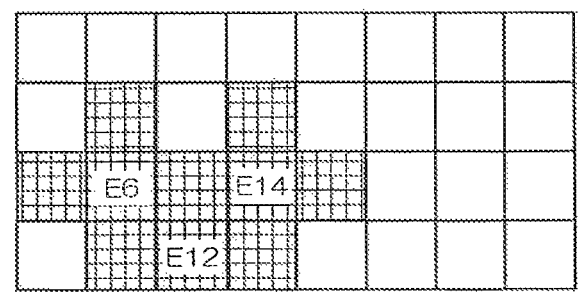
FIG. 18D is a diagram illustrating an example of the NDVI map in units of regions in the modification, in accordance with the present invention.

In the example in FIG. 18A, since the positional deviation of the low index regions is small, gaps remain between low index regions even if new low index regions are added, as shown in FIG. 18C. On the other hand, in the example in FIG. 18B, since the positional deviation of the low index regions is large, new low index regions increase so as to fill the gaps, and the low index regions become continuous, as shown in FIG. 18D. As a result, in the example in FIG. 18D, the flight distance in the second shooting flight is small, compared with the example in FIG. 18C.

In this way, the larger the positional deviation of the low index region is, the more the increase in the flight distance when the index threshold is increased can be suppressed. In this modification, compared with the case where the index threshold is changed without considering the positional deviation of the low index regions, in the second shooting flight, the remaining battery capacity is effectively utilized while suppressing excessive consumption of the battery, and as a result, growth information indicating more accurate growth conditions can be recorded.

Note that the deviation value is not limited to the value described above. For example, the average value of the distances between one low index region and another low index region (as this value decreases, distances between low index regions decrease, and the positions are concentrated, that is, the positional deviation is large), may also be used as the deviation value. In addition thereto, any value may be used as long as the value indicates the positional deviation of the low index regions.

2-5. Size of Detour

As the method of dynamically changing the index threshold, a method different from those of the modifications described above may also be used. In this modification, similarly to the above-described modifications, index map generation unit 103 first generates an NDVI map in units of regions using a provisional threshold as the index threshold.

FIGS. 20A to 20D show examples of the NDVI map in units of regions of this modification. In FIGS. 20A to 20D, sectional regions (low index regions) regarding which NDVI is less than the index threshold are applied with a pattern. In the example in FIG. 20A, sectional regions E12 and E21 are low index regions, and in the example in FIG. 20B, sectional regions E9 and E24 are low index regions. Index map generation unit 103 supplies the NDVI map in units of regions that is generated using the provisional threshold to flight instruction unit 105.

Flight instruction unit 105 uses a larger value as the index threshold in place of the provisional threshold, as the distance decreases between a path of drone 20 toward a scheduled landing point when the provisional threshold is determined as the index threshold and a portion whose NDVI is less than the provisional threshold. Flight instruction unit 105 provisionally determines, in the examples in FIGS. 20A to 20D, a path B3 from above a sectional region E32 directly toward a sectional region E1 as the path toward the scheduled landing point. Flight instruction unit 105 calculates the distance between the provisionally determined path B3 and the low index regions.

Figure 20A:
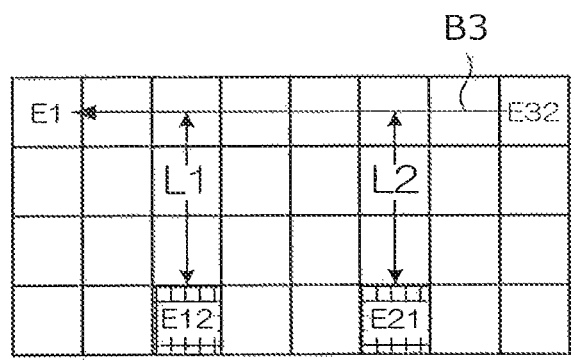
FIG. 20A is a diagram illustrating an example of the NDVI map in units of regions in the modification, in accordance with the present invention.
Figure 20B:
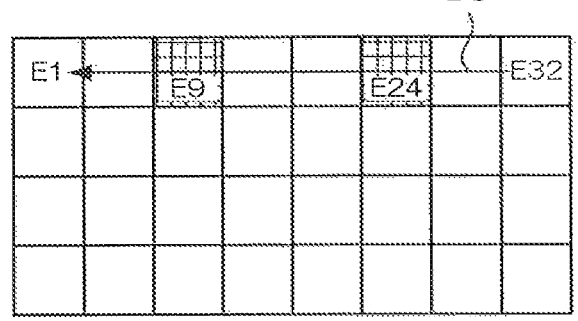
FIG. 20B is a diagram illustrating an example of the NDVI map in units of regions in the modification, in accordance with the present invention.

Flight instruction unit 105 calculates, in the example in FIG. 20A, the sum of distances L1 and L2 between the path B3 and the low index regions E12 and E21, and in the example in FIG. 20B, the sum of distances between the path B3 and the low index regions E9 and E24 as 0 (since the path B3 passes through both of the low index regions). Flight instruction unit 105 determines the index threshold using a threshold table in which the distance between a provisionally determined path and low index regions is associated with the index threshold.

Figures 21, 22, 23:
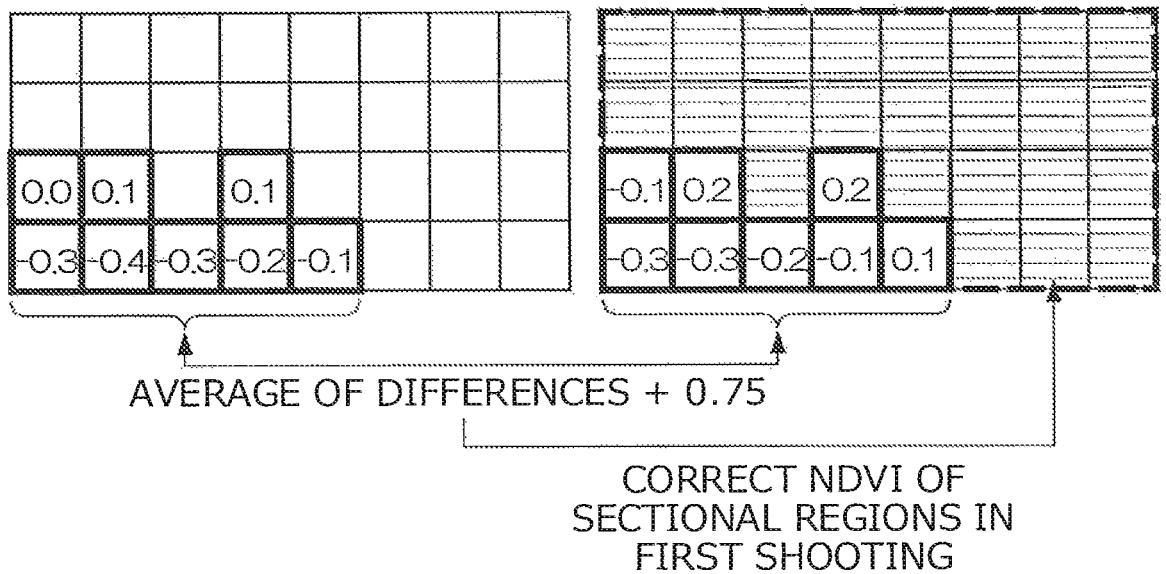
FIG. 21 is a diagram illustrating an example of a threshold table, in accordance with the present invention.
FIG. 22 is a diagram illustrating an example of an altitude table, in accordance with the present invention.
FIG. 23 is a diagram illustrating an example of correction, in accordance with the present invention.

FIG. 21 shows an example of the threshold table. In the example in FIG. 21, the distances of "L21 or more", "L11 or more and less than L21", and "less than L11" are respectively associated with index thresholds of "Th1", "Th2", and "Th3" (Th1<Th2<Th3). Flight instruction unit 105 determines the low index regions that are to be shot in the second shooting using the index threshold associated with the density value in the threshold table in place of the provisional threshold, and makes an instruction to shoot the determined low index regions.

Figure 20C:
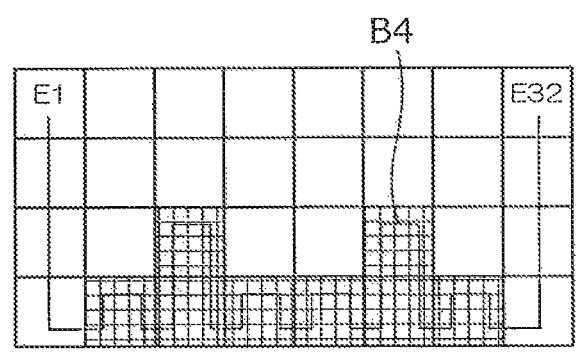
FIG. 20C is a diagram illustrating an example of the NDVI map in units of regions in the modification, in accordance with the present invention.
Figure 20D:
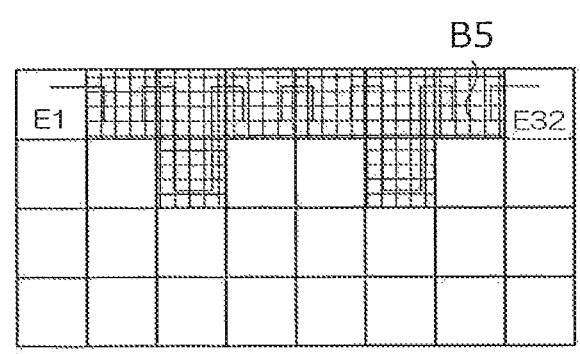
FIG. 20D is a diagram illustrating an example of the NDVI map in units of regions in the modification, in accordance with the present invention.

As the above-described shift distance increases, the distance of detour that is to be made separating from the path B3 that is provisionally determined in the second shooting flight increases. FIG. 20C shows a flight path B4 of the second shooting flight when the index threshold is increased and the low index regions shown in FIG. 20A have extended, and FIG. 20D shows a flight path B5 when the index threshold is increased and the low index regions shown in FIG. 20B have extended.

If the index threshold is increased in each of the cases shown in FIGS. 20A and 20B without considering the size of detour, the possibility of the battery is to be depleted increases, because the distance is large when a flight is made through the flight path B4 compared with the case of making a flight through the flight path B5. In this modification, the index threshold is decreased as the shift distance increases, as described above, and as a result, a situation does not easily occur in which the remaining battery capacity is not sufficient in the second shooting flight by not allowing the low index regions to extend when the shift distance is large, compared with the case of not considering the size of the shift distance.

2-6. Flight Altitude at Low Altitude

In the embodiment, flight instruction unit 105 makes an instruction to reduce the flight altitude in the second shooting flight than that of the first shooting flight. Flight instruction unit 105 may make a more detailed instruction regarding the flight altitude in the second shooting flight. Specifically, flight instruction unit 105 may make an instruction to maintain the altitude at a height corresponding to the crop type or more when performing a low-altitude flight.

Flight instruction unit 105 determines the flight altitude in the second flight shooting using an altitude table in which the crop type is associated with the flight altitude.

FIG. 22 shows an example of the altitude table. In the example in FIG. 22, the crop type of "cabbage, radish, etc.", "rice, wheat, etc.", and "corn, sugarcane, etc." are respectively associated with the flight altitudes of "H1", "H2", and "H3" (H1<H2<H3). In this altitude table, the smaller the height of the crop is, the lower flight altitude is associated therewith.

In this modification, the user registers, in advance, the type of crop that is grown in each field, and flight instruction unit 105 stores the registered crop type in association with a field ID for identifying the field. Shooting unit 204 of drone 20 adds the field ID to image data, and transmits the image data. Index map generation unit 103 generates the NDVI map in association with the field ID, and supplies the NDVI map to flight instruction unit 105.

Flight instruction unit 105 reads out the crop type stored in association with the field ID that is associated with the NDVI map, when making an instruction of the second shooting flight based on the supplied NDVI map, and makes an instruction to fly at a flight altitude that is associated with the crop type in the altitude table. In the altitude table, for each of a plurality of crops, the lowest flight altitude is determined, of the flight altitudes at which the crop will not fall by the wind caused by the rotors of drone 20 (downwind).

For example, a method of making a flight always at a flight altitude H3 that is highest in the altitude table is conceivable in order to merely ensure that any type of crop will not fall. In contrast, if the method of this modification is used, the resolution of a crop image is increased by reducing the flight altitude as far as possible while ensuring that the crop will not fall by the downwind, and therefore the growth information indicating more accurate growth conditions can be recorded.

Note that, in the example in FIG. 22, a crop having a lower height is associated with a lower flight altitude, but there is no limitation thereto, and a crop type that has a high height but is strong against a wind may be associated with a low flight altitude. In other words, a flight altitude need only be associated at which, when a flight is performed at the flight altitude instructed by flight instruction unit 105, the crop will not fall by the downwind.

2-7. Index Correction

The index obtained by the first shooting may be corrected using the index having a high accuracy obtained in the second shooting. In this modification, index calculation unit 102 first, similarly to the embodiment, calculates the NDVI of a portion that is a low index region in the first shooting, based on the image shot by drone 20 in the second shooting flight in accordance with the instruction made by flight instruction unit 105.

Index calculation unit 102 corrects the NDVI with respect to the entirety of the image that has been previously shot, according to the difference between the NDVI calculated in this way and the NDVI calculated previously regarding the low index region. Index calculation unit 102 calculates, for each low index region, the difference between the NDVI calculated in the first shooting and the NDVI calculated in the second shooting, and calculates the average value of the differences with respect to all of the low index regions, for example. This average value of the differences indicates the tendency of the difference between the first NDVI and the second NDVI having a higher accuracy.

Index calculation unit 102 performs correction such that, using the average value of the differences as the correction value, the correction value is added to the NDVI (NDVI that is the index threshold or more) of each sectional region regarding which the second shooting is not performed.

FIG. 23 shows an example of the correction. In FIG. 23, NDVIs of eight low index regions (regions surrounded by thick lines) that are calculated in the first and second shootings are respectively shown.

In this example, from the first shooting to the second shooting, 0.0 changes to −0.1 (difference: −0.1), −0.3 changes to −0.3 (difference: 0.0), 0.1 changes to 0.2 (difference: +0.1), −0.4 changes to −0.3 (difference: +0.1), −0.3 changes to −0.2 (difference: +0.1), 0.1 changes to 0.2 (difference: +0.1), and −0.2 changes to −0.1 (difference: +0.1), −0.1 changes to 0.1 (difference: +0.2).

The average value of the differences in this case is +0.6/8=+0.075. Index calculation unit 102 calculates the value obtained by adding 0.075 to the NDVI of each of the sectional regions other than the low index regions as the corrected NDVI. According to this modification, the NDVI value in the sectional region with respect to which the second shooting, in which the resolution of the crop image is increased relative to the first shooting, is not performed can be approximated to a correct value, compared with the case where the above-described correction is not performed.

2-8. Removal of Reflected Light

Index calculation unit 102 calculates the NDVIs regarding all of the pixels in the embodiment, but there is no limitation thereto. For example, there are cases where pixels indicating reflected light of sunlight are included in the image, as described above, and therefore the configuration may be such that index calculation unit 102 does not calculate the NDVI with respect to such an image.

In this modification, index calculation unit 102 calculates the NDVI by removing pixels, of the pixels of the image of the crop region acquired by crop image acquisition unit 101, whose brightness is a predetermined criterion or more. Each pixel is represented by, in addition to the pixel value (IR) indicating the light having a wavelength in the near infrared region, pixel values (R, G, and B) respectively indicating red, green, and blue, which are three primary colors of the visible light. Index calculation unit 102 determines that the pixel having pixel values of the three primary colors respectively higher than thresholds is a pixel whose brightness is the predetermined criterion or more, for example.

As a result of index calculation unit 102 calculating the NDVIs regarding the pixels obtained by removing the pixels determined in this way, the accuracy of the calculated NDVIs can be increased, relative to the case where the pixels representing reflected light are not removed. Note that, although pixel values of G and B are not needed for calculating the NDVI, as a result of shooting light of these colors, pixels whose R, G, and B pixel values are all high, that is, pixels representing reflected light whose color is close to white can be more appropriately removed.

2-9. Zoom

Flight instruction unit 105 makes an instruction to increase the resolution of the crop image by performing a low-altitude flight relative to the first shooting, in the embodiment, but the method of increasing the resolution is not limited thereto. When shooting apparatus 27 of drone 20 includes a zoom lens for causing the focal distance to change, flight instruction unit 105 makes an instruction to shoot a low index region while increasing the focal distance relative to that when the image with respect to which an index of the low index region has been calculated has been shot.

When the focal distance is increased, the shooting region narrows, and the number of pixels representing a unit area of the crop region increases, and as a result, the resolution of the above-described crop image increases. Therefore, making an instruction to increase the focal distance is equivalent to make an instruction to shoot the low index region while increasing the resolution. In this modification as well, similarly to the embodiment, as a result of increasing the resolution of the crop image in the second shooting, the accuracy of the NDVI obtained from the shot image can be increased.

Note that when, as in the embodiment, only a low-altitude flight is instructed, shooting apparatus 27 need only include a single focus lens, and therefore the weight of drone 20 can be reduced relative to the case of using a zoom lens. Also, there is a tendency that a bright image can be shot with a fixed focal lens, and the pixel value increases relative to the case of using the zoom lens, and as a result, the accuracy of the NDVI can be increased, as described with reference to FIG. 11.

2-10. Shooting Range

Flight instruction unit 105 makes an instruction to increase the resolution of the crop image, in the embodiment, but there is no limitation thereto, and flight instruction unit 105 may also make instruction to shoot the low index region while reducing the shooting range, although the resolution of the crop image is not changed.

In this case, it is assumed that shooting apparatus 27 of drone 20 includes, outside of the lens, a shutter that can be opened and closed, and can change the angle of view by changing the opening degree of the shutter while not changing the focal distance (an image in which the portion hidden by the shutter is blackened is shot). By merely narrowing the shooting range in this way, the number of pixels that represents the reflected light (sunlight reflected by a water surface) decreases, and therefore the accuracy of the calculated NDVI can be increased.

2-11. Index Representing Growth Conditions

The NDVI is used as the index representing the growth conditions, in the embodiment, but there is no limitation thereto. For example, a leaf color value (value indicating the leaf color), a vegetation rate (occupancy rate of the vegetation region per unit area), SPAD (chlorophyll content), a plant height, a number of stems, or the like may also be used. In other words, any value may be used as the index representing the growth conditions, as long as the value represents the growth conditions of a crop, and the value can be calculated from a shot image of the crop region.

2-12. Aircraft

Although the embodiment describes using a rotary wing-type aircraft as an aircraft that carries out autonomous flight, the aircraft is not limited thereto. For example, the aircraft may be a fixed-wing aircraft, or may be a helicopter-type aircraft. Additionally, autonomous flight functionality is not necessary, and for example, a radio-controlled (wirelessly-operated) aircraft, which is operated remotely by an operation manager, may be used, as long as the aircraft can fly in allocated flight airspace during in allocated permitted flight period.

2-13. Apparatuses that Realize Units

The apparatuses that realize the functions shown in FIG. 4 and the like may be different from those shown in the diagrams. For example, the drone may include all of or some of the functions included in the server apparatus, and the drone may calculate the index, record the growth information, and make an instruction of the second shooting flight by itself.

In this case, the processor of the drone is an example of an "information processing apparatus" of the present invention. Also, the functions of the server apparatus may be realized by a user terminal (a notebook PC, a smartphone, or the like) used by the user. In this case, the user terminal is an example of the "information processing apparatus" of the present invention. Also, the operations performed by each function may be performed by another function, or by a new function. For example, the operations performed by index calculation unit 102 (calculation operation of the index) may be performed by index map generation unit 103.

Also, the operations performed by index map generation unit 103 may be divided, and the function of generating a first NDVI map and the function of generating a second NDVI map may be newly provided, for example. Also, the functions included in the server apparatus may be realized by two or more apparatuses. In other words, as long as the agriculture support system realizes these functions as a whole, the number of apparatuses included in the agriculture support system is not limited.

2-14. Category of the Invention

The present invention may be understood as an information processing apparatus such as the server apparatus described above, an aircraft such as a drone (the drone may also act as the information processing apparatus), as well as an information processing system such as the agriculture support system including those apparatuses and the aircraft. The present invention can also be understood as an information processing method for implementing the processing executed by the respective apparatuses, as well as a program for causing a computer that controls the respective apparatuses to function. The program may be provided by being stored in a recording medium such as an optical disk or the like, or may be provided by being downloaded to a computer over a network such as the Internet and being installed so as to be usable on that computer.

2-15. Processing Sequences, Etc

The processing sequences, procedures, flowcharts, and the like of the embodiments described in the specification may be carried out in different orders as long as doing so does not create conflict. For example, the methods described in the specification present the elements of a variety of steps in an exemplary order, and the order is not limited to the specific order presented here.

2-16. Handling of Input/Output Information, Etc

Information and the like that has been input/output may be saved in a specific location (e.g., memory), or may be managed using a management table. The information and the like that has been input/output can be overwritten, updated, or added to. Information and the like that has been output may be deleted. Information and the like that has been input may be transmitted to other apparatuses.

2-17. Software

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and so on.

Additionally, software, commands, and so on may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, these hardwired technologies and/or wireless technologies are included in the definition of "transmission medium".

2-18. Information and Signals

The information, signals, and so on described in the specification may be realized using any of a variety of different techniques. For example, data, instructions, commands, information, signals, bits, symbols, chips, and so on that may be referred to throughout all of the foregoing descriptions may be realized by voltages, currents, electromagnetic waves, magnetic fields or magnetic particles, photo fields or photons, or any desired combination thereof.

2-19. Systems and Networks

The terms "system" and "network" used in the specification can be used interchangeably.

2-20. Meaning of "Based On"

The phrase "based on" used in the specification does not mean "based only on" unless specifically mentioned. In other words, the phrase "based on" means both "based only on" and "based at least on".

2-21. "And" and "Or"

In the specification, with respect to configurations that can be realized both as "A and B" and "A or B", a configuration described using one of these phrases may be used as a configuration described by the other of these phrases. For example, if the phrase "A and B" is used, "A or B" may be used as long as implementation is possible without conflicting with the other phrase.

2-22. Variations, Etc. On Embodiment

The embodiment described in the specification may be used alone, may be combined, or may be switched according to how the invention is to be carried out. Additionally, notifications of predetermined information (e.g., a notification that "X is true") are not limited to explicit notifications, and may be carried out implicitly (e.g., the notification of the predetermined information is not carried out).

Although the foregoing has described the present invention in detail, it will be clear to one skilled in the art that the present invention is not intended to be limited to the embodiments described in the specification. The present invention may be carried out in modified and altered forms without departing from the essential spirit and scope of the present invention set forth in the appended scope of patent claims. As such, the descriptions in the specification are provided for descriptive purposes only, and are not intended to limit the present invention in any way.

REFERENCE SIGN LIST

1 Agriculture support system
10 Server apparatus
20 Drone
101 Crop image acquisition unit
102 Index calculation unit
103 Index map generation unit
104 Growth information recording unit
105 Flight instruction unit
106 Index accuracy determination unit
107 Distance information acquisition unit
201 Flight control unit
202 Flight unit
203 Sensor measurement unit
204 Shooting unit

What is claimed is:

1. An information processing apparatus comprising:
a processor configured to:
acquire a first image of each crop region of a field that is shot by an aircraft that includes a shooting function;
calculate, based on each of the acquired first images, a respective first index indicative of growth conditions of a crop in each first image of the crop region;
instruct the aircraft to shoot a second image of each crop region having a respective calculated first index less than an index threshold with an increased resolution or a narrowed shooting range;
acquire the second image of each crop region that is shot by the aircraft;
calculate, based on each of the acquired second images, a respective second index indicative of growth conditions of the crop in each second image of the crop region; and
generate an index map of the field, indicative of the growth conditions of the crop in each crop region, based on the first index and second index.

2. The information processing apparatus according to claim 1, wherein the processer is further configured to:
determine an accuracy of the calculated first index; and
use a greater value as the index threshold, as the determined accuracy decreases.

3. The information processing apparatus according to claim 1, wherein the processer is further configured to:
acquire information indicative of a remaining possible flight distance of the aircraft; and
use a greater value as the index threshold, as the remaining possible flight distance indicated by the acquired information increases.

4. The information processing apparatus according to claim 1, wherein the processer is further configured to:
when a provisional threshold is determined as the index threshold, use a greater value as the first index threshold in place of the provisional threshold, as a positional deviation of at least one portion for which the first index is less than the provisional threshold increases.

5. The information processing apparatus according to claim 1, wherein the processer is further configured to:
when a provisional threshold is determined as the index threshold, use a greater value as the first index threshold in place of the provisional threshold, as a distance between a path of the aircraft toward a scheduled landing point and a portion for which the first index is less than the provisional threshold decreases.

6. The information processing apparatus according to claim 1, wherein the processer is further configured to:
make an instruction for the aircraft to shoot the second image of each crop region at an altitude that is lower than that when the first image of each respective crop region was shot.

7. The information processing apparatus according to claim 6, wherein the processer is further configured to:
  make an instruction to maintain an altitude that is higher than or equal to a height an altitude corresponding to a type of the crop when shooting the second image at the altitude that is lower than that when the first image was shot.

8. The information processing apparatus according to claim 1, wherein the processer is further configured to:
  correct the calculated first index for each crop region having a respective calculated first index greater than or equal to the index threshold in accordance with a difference between the calculated first index and the calculated second index of the respective acquired first image and second image.

9. The information processing apparatus according to claim 1, wherein the processer is further configured to:
  prior to calculating the index, remove one or more pixels from the acquired image, a brightness of which is greater than or equal to a predetermined brightness.

10. The information processing apparatus according to claim 1, wherein the generated index map represents the calculated first index for each crop region having a respective calculated first index greater than or equal to the index threshold and the calculated second index for each crop region having a respective calculated first index less than the index threshold.

* * * * *